United States Patent [19]
Okamoto

[11] Patent Number: 5,772,970
[45] Date of Patent: Jun. 30, 1998

[54] REACTION COLUMN

[75] Inventor: Yasuo Okamoto, Kanagawa-ken, Japan

[73] Assignee: Nippon Oil Co., Ltd., Tokyo, Japan

[21] Appl. No.: 761,316

[22] Filed: Dec. 6, 1996

[51] Int. Cl.⁶ .......................................................... B01J 8/04
[52] U.S. Cl. .......................... 422/191; 422/194; 422/195; 422/224; 261/97; 261/114.1
[58] Field of Search ..................................... 422/198, 191, 422/194, 195, 217, 224; 366/165.1, 165.2; 208/146; 261/114.1, 97

[56] References Cited

U.S. PATENT DOCUMENTS

| 3,824,080 | 7/1974 | Smith et al. | 422/191 |
|---|---|---|---|
| 3,824,081 | 7/1974 | Smith et al. | 422/217 |
| 5,403,560 | 4/1995 | Deshpande et al. | 422/190 |

FOREIGN PATENT DOCUMENTS

53-25315  7/1978  Japan .

*Primary Examiner*—Hien Tran
*Attorney, Agent, or Firm*—Reid & Priest LLP

[57] ABSTRACT

A reaction column comprising a reactor, at least one catalyst bed comprising a solid catalyst with which a mixture of a gas with a liquid is brought into contact; and a cooling bed provided below the catalyst bed. The cooling bed includes a cooling fluid feed section and a mixing mechanism for mixing a cooling fluid with the mixture of a gas with a liquid falling down through the reactor. The mixing mechanism is provided below the cooling fluid feed section of the cooling bed, and includes a collector tray provided along a horizontal cross-sectional region of the reactor, a swirl baffle vertically provided substantially at the center portion of the upper surface of the collector tray, and a weir extending upward from the collector tray. The swirl baffle is formed with a cylindrical member having a central axis substantially coincident with the central axis of the collector tray. Inflow ports respectively for the cooling fluid and the mixture of a gas with a liquid are provided at a plurality of positions discrete from each other by a predetermined angle in the circumferential direction of the circumferential wall of the cylindrical member. A guide plate is connected in a substantially tangential direction to a first side edge of each of the inflow ports. The weir is connected to a through hole provided in the interior of the swirl baffle, and is formed with a cylindrical member having a central axis substantially coincident with the central axis of the collector tray. The weir preferably defines an upper mixing cap and outflow ports respectively for the cooling fluid and the mixture are provided at a plurality of positions discrete from each other by a predetermined angle in the circumferential direction of the circumferential wall of the weir.

5 Claims, 12 Drawing Sheets

REACTION COLUMN

BACKGROUND OF THE INVENTION (1) Application Field of the Invention

The present invention relates to a reaction column for use in desulfurization equipment or cracking equipment for a gas oil or a heavy fuel oil, which reaction column carries out a hydrogenation reaction or hydrocracking in the presence of a catalyst packed into the column. In particular, the present invention relates to a technique which can enhance the efficiency in mixing a cooling fluid with a gas-liquid mixture, thereby improving the service life of the catalyst and the efficiency of the whole reaction column.

(2) Related Art of the Invention

A vertical falling reaction column has hitherto been known wherein one or more catalyst beds are provided within a reactor and a mixture of a gas with a liquid is brought into contact with a solid catalyst contained in the catalyst bed and falls down through within the reactor.

The reaction column, for example, is applied to various continuous processes wherein a mixture of hydrogen gas as a gas with a liquid is brought into contact with a solid catalyst, and useful, for example, for processes where petroleum is reacted in the presence of hydrogen, such as hydro-refining process for removing sulfur and nitrogen contained in petroleum and hydrocracking process for converting hydrocarbons having a relatively high molecular weight to hydrocarbons having a lower molecular weight.

The above reactions between the petroleum and hydrogen are called a "hydrogen treatment reaction" and include both hydro-refining for removing impurities and hydrocracking for reducing the molecular weight.

A vertical falling reaction column having a number of catalyst beds is generally used for hydrogen treatment of a heavy oil.

Since such a hydrogen treatment reaction is exothermic, a hydrogen cooling fluid is introduced into a cooling bed provided between continuous catalyst beds. The hydrogen cooling fluid serves to absorb heat from the mixture of a hydrogen gas with a liquid, thereby regulating the reaction temperature in a desired temperature range.

In addition, the cooling fluid serves to maintain the hydrogen to hydrocarbon ratio at a desired high value.

A heavy fuel oil is likely to be thermally cracked upon treatment at a high temperature, giving cracking products and, further, high-molecular weight carbonaceous substances and solid coke.

The above thermal cracking depends to some extent upon cracking time. For this reason, preferably, no portion where a liquid stays at a high temperature without flow for a long period of time is present within a reaction column for treating the heavy fuel oil.

The liquid portion that has a high temperature and stays without flow undergoes thermal cracking with lapse of time and, in addition, accumulates carbonaceous precipitates.

Further, there is a possibility of the carbonaceous precipitates to inhibit the flow of reactants passing through the reaction column, resulting in clogging of the reaction column.

In addition to the thermal cracking, the heavy fuel oil is likely to be decomposed in the presence of a hydrogen treating catalyst and, under severe conditions, produces large amounts of high-molecular weight carbonaceous substances and solid coke.

The carbonaceous substances from both the thermal cracking and the decomposition in the presence of a catalyst are accumulated on the hydro-refining catalyst, and the accumulation of the carbonaceous substances unfavorably reduces the activity of the catalyst.

Thus, the conventional reaction columns had problems including that the catalyst is likely to be deteriorated, the service life of the catalyst is lowered and the efficiency of the whole reaction column is lowered.

In view of the above conventional problems, as disclosed in Japanese Examined Patent Publication No. 53-25315, a reaction column has been proposed wherein means for distributing and feeding a mixture of a gas with a liquid, such as a tray is provided on the second catalyst bed. The effect of such a reaction column, however, is unsatisfactory.

SUMMARY OF THE INVENTION

The present invention has been made with a view to solving the above problems of the prior art, and an object of the present invention is to render the catalyst less susceptible to deterioration, improve the service life of the catalyst and, at the same time, to improve the efficiency of the whole reaction column by providing mixing means, having a unique mixing action, below a cooling fluid feed section of the cooling bed below the catalyst bed.

In order to attain the above object, the present invention provides a reaction column, wherein a mixture of a gas with a liquid reacts with a solid catalyst contained in one or more catalyst beds provided within a reactor by being brought into contact with the solid catalyst, falls down within the reactor and is mixed with a cooling fluid in a cooling bed below the catalyst bed, comprising;

mixing means being provided below a cooling fluid feed section of the cooling bed, the mixing means comprising a collector tray provided along a horizontal cross-sectional region of the reactor, a swirl baffle vertically provided substantially at the center portion of the upper surface of the collector tray, and a weir, extending upward, connected to a through hole provided substantially at the center portion in the interior of the swirl baffle of the collector tray, the swirl baffle being formed with a cylindrical member having a central axis substantially coincident with the central axis of the collector tray.

inflow ports respectively for the cooling fluid and the mixture of a gas with a liquid being provided at a plurality of positions discrete from each other by a predetermined angle in the circumferential direction of the circumferential wall of the cylindrical member, a guide plate being connected in a substantially tangential direction to one side edge of each of the inflow ports, the guide plate serving to guide the cooling fluid and the mixture of a gas with a liquid so that the cooling fluid and the mixture of a gas with a liquid flowed from the inflow ports into the swirl baffle swirl in the same direction within the swirl baffle, the weir cap being formed with a cylindrical member having a central axis substantially coincident with the central axis of the collector tray.

A mixture of a gas with a liquid, which flows down through the catalyst bed, and a cooling fluid from the cooling bed drop onto the top surface of the collector tray and then flow through the inflow ports of the swirl baffle substantially tangentially into the swirl baffle. The mixture of a gas with a liquid and the cooling fluid, which have flowed into the swirl baffle, flow through within the swirl baffle while swirling and, in the course of swirling, flow away over the weir and are discharged through the through hole.

Creation of a swirling stream on the collector tray to attain mixing to some extent and, at the same time, provision of the weir can further accelerate mixing, resulting in improved mixing efficiency, improved service life of the catalyst, and enhanced efficiency of the whole reaction column.

In particular, it is preferable that the above weir is an upper mixing cap and outflow ports respectively for the cooling fluid and the mixture are provided at a plurality of positions discrete from each other by a predetermined angle in the circumferential direction of the circumferential wall of the upper mixing cap, the outflow ports being provided in a region defined by a line, which connects the other side edges of the inflow ports in the swirl baffle to the center of the cylindrical member of the upper mixing cap, and a line, which passes through the center and, as viewed from above, makes a predetermined angle with the line in a direction opposite to the swirl direction of the cooling fluid and the mixture of a gas with a liquid.

In this case, the mixture of a gas with a liquid and the cooling fluid, which have flowed into the swirl baffle, flow through within the swirl baffle while swirling and, in the course of swirling, flow away through the outflow ports provided in the circumferential wall of the cylindrical member of the upper mixing cap and are discharged through the through hole.

Provision of outflow ports of the upper mixing cap, for the cooling fluid and the mixture of a gas with a liquid, in a predetermined positional relationship thereof with the inflow ports so as for liquids from both directions to collide against each other can further accelerate mixing, resulting in markedly improved mixing efficiency, improved service life of the catalyst, and enhanced efficiency of the whole reaction column.

The above reaction column preferably further comprises a lower mixing cap, extending downward, connected to the through hole formed at the collector tray, the lower mixing cap comprising a first cylindrical member, having a central axis substantially coincident with the central axis of the collector tray, both ends of which are open, a second cylindrical member which is provided below the first cylindrical member so as to be discrete therefrom and the top of which is open with the bottom being closed, and a bridge member for connecting both cylindrical members to each other.

The mixture of a gas with a liquid discharged from the through hole reaches the interior of the lower mixing cap, drops onto the inner bottom wall of the second cylindrical member of the lower mixing cap and flows through a gap formed between the first cylindrical member and the second cylindrical member.

Thus, the distributing action of the lower mixing cap accelerates the mixing, resulting in markedly improved mixing efficiency, improved service life of the catalyst, and further enhanced efficiency of the whole reaction column.

In particular, the angle for the provision of the outflow ports is preferably in the range of from 35° to 130°.

This enables outflow ports of the upper mixing cap, for the cooling fluid and the mixture of a gas with a liquid, to be provided in a better positional relationship thereof with the inflow ports, which further accelerates the mixing.

The angle for the provision of the outflow ports is still preferably in the range of from 45° to 90°, which further accelerates the mixing.

The present invention will now be described in more detail with reference to an embodiment shown in the accompanying drawings. This will facilitate understanding of the present invention. The present invention, however, is not limited to the embodiment, and variations and modifications can be freely effected within the scope of claims for the patent.

DETAILED DESCRIPTION OF THE PREFERRED EMBODIMENT

Figure 7:
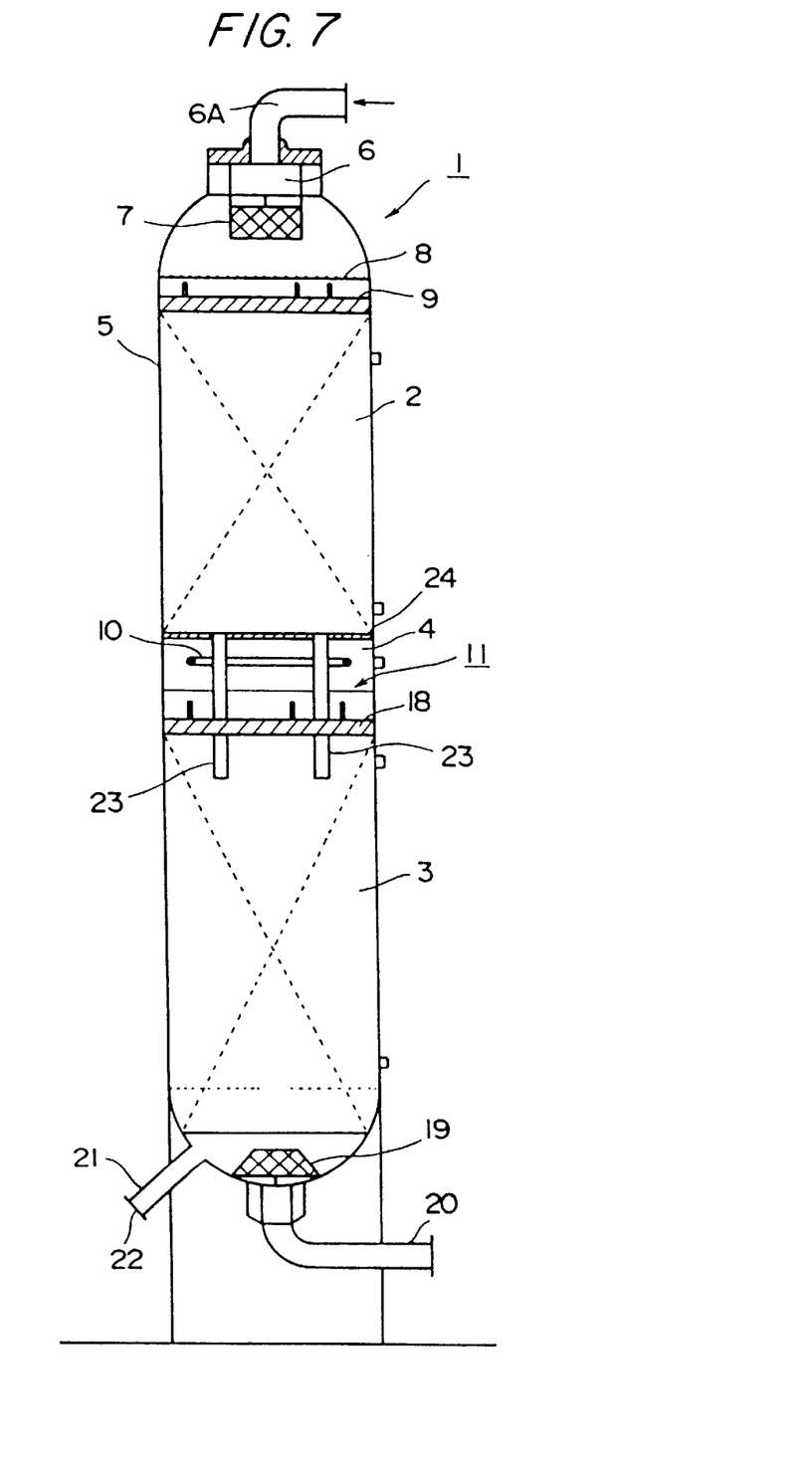
FIG. 7 is a front view of the whole reaction column.

At the outset, the construction of the whole reaction column will now be described with reference to FIG. 7.

In the drawing, a vertical falling reaction column 1 comprises a reactor 5, through which a mixture of a gas with a liquid is passed in the presence of a solid catalyst, provided with first and second catalyst beds 2 and 3 and a cooling bed 4.

A mixture of a gas with a liquid is fed from a pipe 6A through an inlet nozzle 6 into the top of the reactor. The inlet nozzle 6 is detachably disposed and consists of a hollow, cylindrical member both ends of which are open.

The mixture of a gas with a liquid, which has been passed through the inlet nozzle 6, is distributed through an inlet basket 7.

In general, a perforated plate 8 and a distributing tray 9 are provided below the inlet basket 7 within the reactor 5 in its upper part.

Since through the distributing tray 9, the gas and the liquid introduced to the reaction column are homogeneously distributed across the horizontal cross-sectional region of the first catalyst bed 2. The first catalyst bed 2 constitutes an upper part of the reactor 5 having solid catalyst beds.

In the course of production using the reaction column 1, the mixture of a gas with a liquid is passed and flows through the first catalyst bed 2 while well in contact with the solid catalyst, during which time a reaction of at least one part of the mixture is allowed to proceed to give a contemplated reaction product.

The mixture of a gaseous phase with a liquid phase is then advanced from the first catalyst bed 2 to the cooling bed 4. The mixture absorbs heat of reaction generated in the first catalyst bed 2, raising the temperature of the mixture. Further, it is noted that one or more reactants in the mixture is consumed and the mixture contains a considerably large amount of a reaction product. A cooling fluid fed into a cooling ring 10 as a cooling fluid feed section enters the cooling bed 4 through a nozzle provided in the cooling ring 10 in such a manner that it is mixed with the mixture present in the cooling bed 4.

The cooling fluid, which is at a low temperature, is mixed with the effluent from the high-temperature first catalyst bed 2 to form a new mixture having an intermediate temperature suitable for entry into the second catalyst bed 3 which causes a further exothermic reaction.

The cooling fluid may be selected from gases, such as vapors, and liquids. Further, it may be substantially inert under reaction conditions within the reactor or alternatively comprises one or more reactive components of the mixture. Preferably, the cooling fluid is selected from vapor components of the mixture. For example, in the case of a hydrorefining reaction, the cooling fluid is preferably hydrogen gas which can serve to lower the temperature of a stream of the mixture from the first catalyst bed 2 and, at the same time, to make up for hydrogen consumed in the hydrorefining reaction.

Figure 1A:
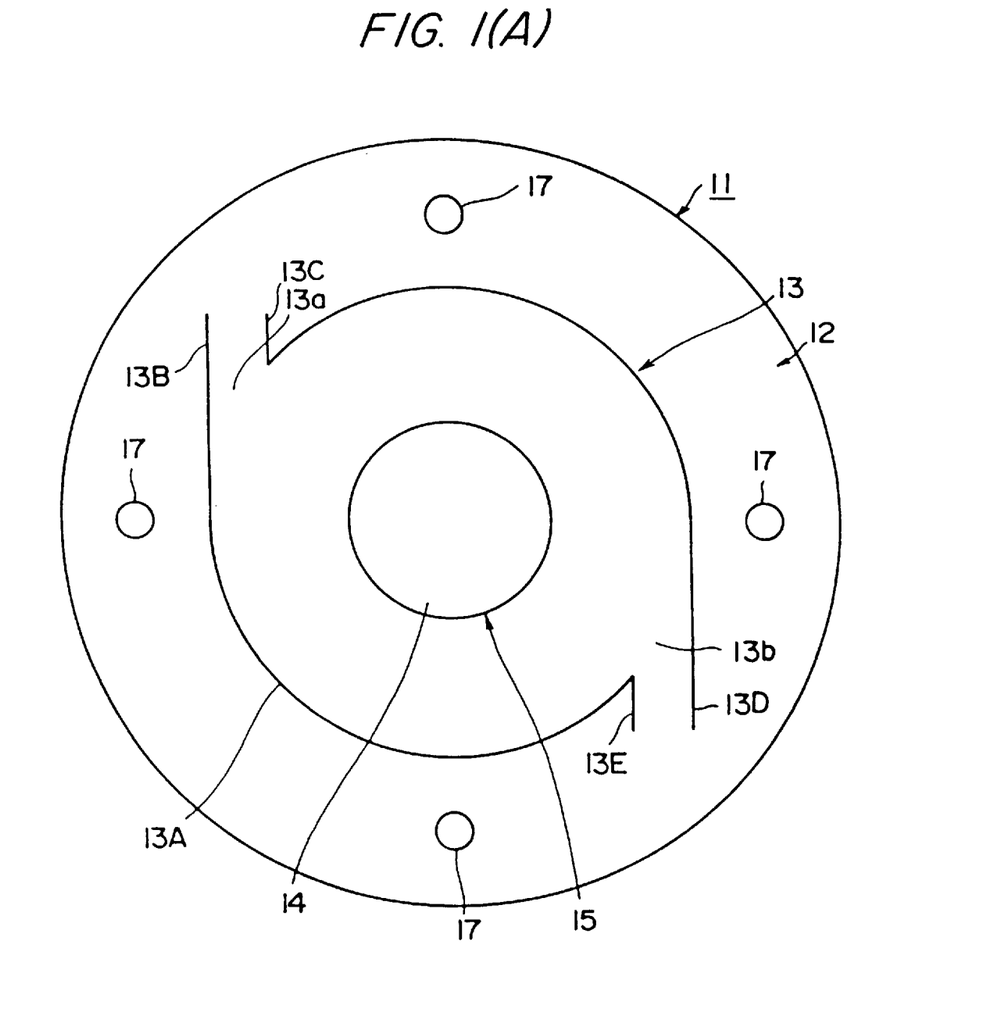
FIG. 1(A) is a plan view showing an embodiment of the mixing tray according to the present invention.
Figure 1B:
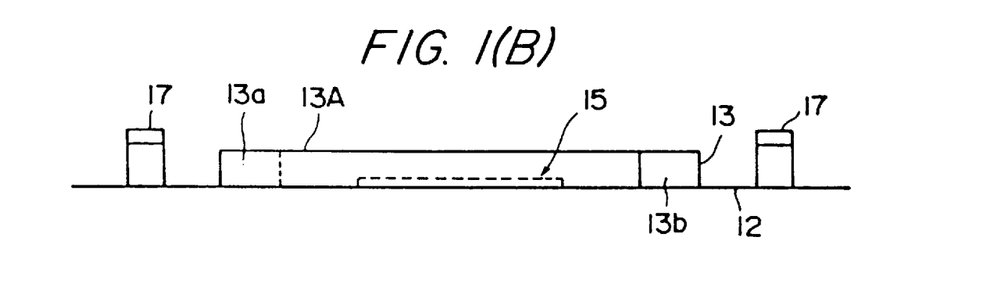
FIG. 1(B) is a front view of the embodiment of the mixing tray of FIG. 1(A)
Figure 3:
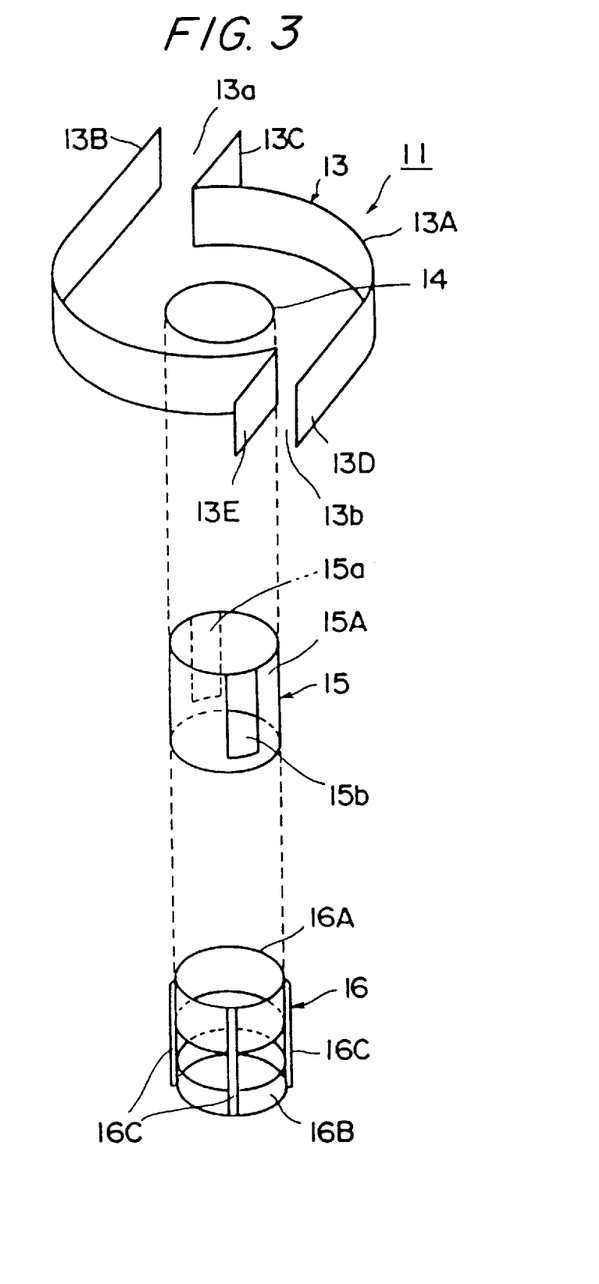
FIG. 3 is an exploded, perspective view of the mixing tray shown in FIG. 1.
Figure 6:
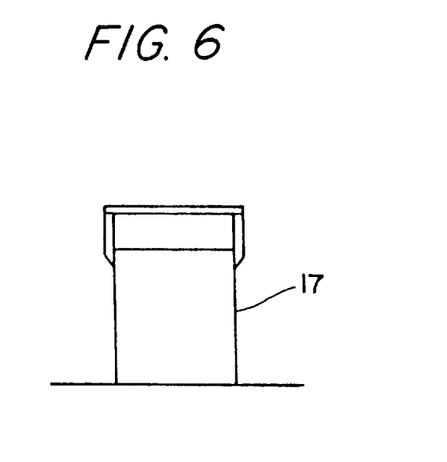
FIG. 6 is a front view of a gas bypass.

In order for the cooling fluid to efficiently lower the temperature of the exothermic reaction mixture, the cooling fluid should serve to well mix the gaseous and liquid phase components of the mixture with each other. In the present invention, a mixing tray 11 is provided as mixing means having a construction as shown in FIGS. 1, 3 and 6.

Specifically, the mixing tray 11 is provided below the cooling ring 10 in the cooling bed 4 below the first catalyst bed 2.

The mixing tray 11 comprises a circular collector tray 12 provided along the horizontal cross-sectional region of the reactor 5, a swirl baffle 13 provided vertically at the central portion of the collector tray 12 in its upper surface, a weir 15, extending upward, connected to a circular through hole 14 formed at the center portion of the inside of the swirl baffle 13 in the collector tray 12.

The weir 15 may be at a height to ensure a residence time during which the mixture and the cooling fluid in the swirl baffle 13 can be homogeneously mixed. The residence time is preferably equal to or above 2.5 seconds.

The above swirl baffle 13 is formed with a cylindrical member 13A with the central axis of the collector tray 12 as the center.

Inflow ports 13a and 13b respectively for the cooling fluid and the mixture of a gas with a liquid are provided at a plurality of positions discrete from each other by a predetermined angle (for example, in the present embodiment, two positions discrete from each other by an angle of 180°) in the circumferential direction of the circumferential wall of the cylindrical member 13A. To one side edges of the inflow ports 13a and 13b are tangentially connected guide plates 13B and 13D which guide the cooling fluid and the mixture of a gas with a liquid so that the cooling fluid and the mixture of a gas with a liquid flowed from the inflow ports 13a and 13b into the swirl baffle 13 swirl in the same direction within the swirl baffle 13.

In the present embodiment, auxiliary guide plates 13C and 13E extending parallel respectively to the guide plates 13B and 13D are connected to the other side edges of the inflow ports 13a and 13b.

Here, in the present invention, an upper mixing cap 15' as shown in FIGS. 2(A), 2(B), 3 and 4, can be provided instead of the weir 15.

The upper mixing cap 15' ensures a high efficiency even if a passing oil quantity drastically changes .

Such an upper mixing cap 15' is formed with a cylindrical member 15A with the central axis of the collector tray 12 as the center.

Outflow ports 15a and 15b respectively for the cooling fluid and the mixture of a gas with a liquid are provided at a plurality of positions discrete from each other by a predetermined angle (for example, in the present embodiment, two positions discrete from each other by an angle of 180°) in the circumferential direction of the cicumcumferential wall of the cylindrical member 15A.

Figure 2A:
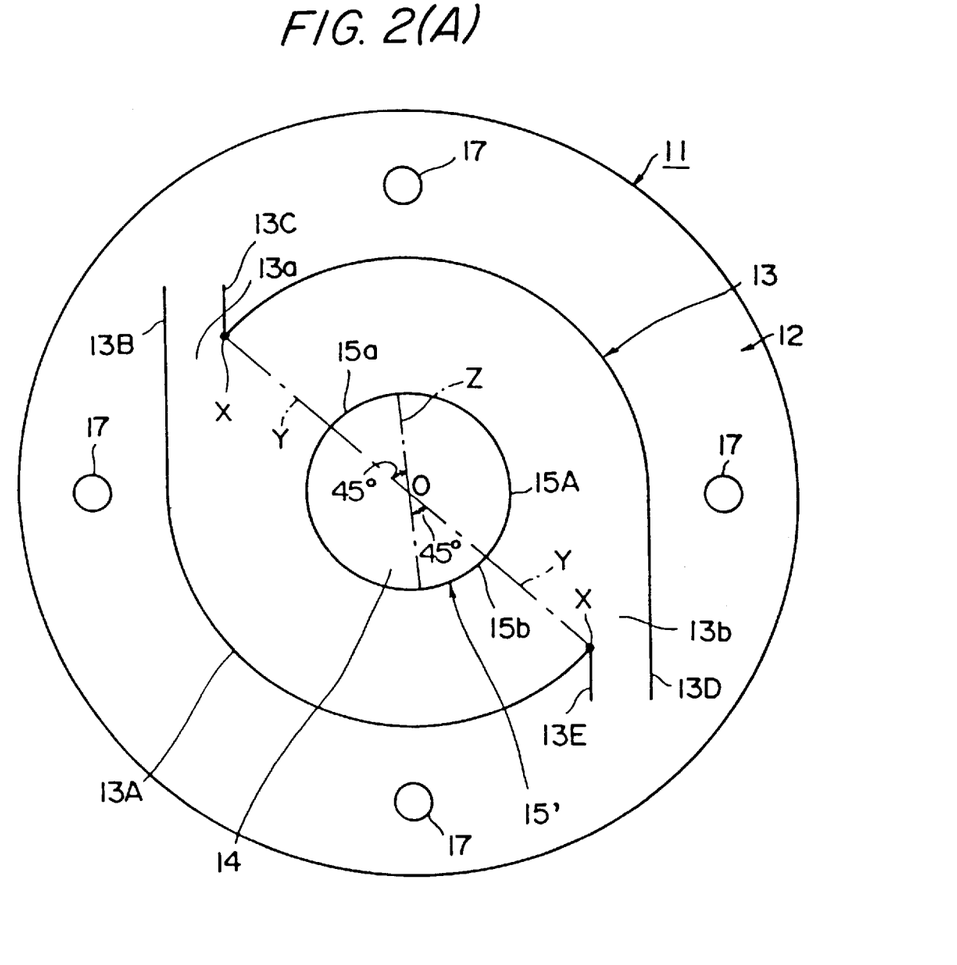
FIG. 2(A) is a plan view showing another embodiment of the mixing tray according to the present invention.
Figure 4A:
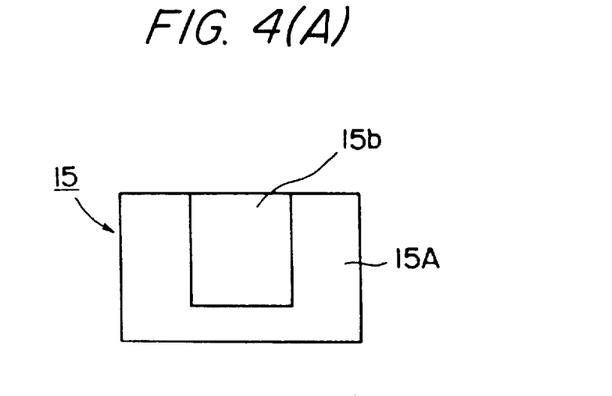
FIG. 4(A) is a front view showing the construction of an upper mixing cap.
Figure 4B:
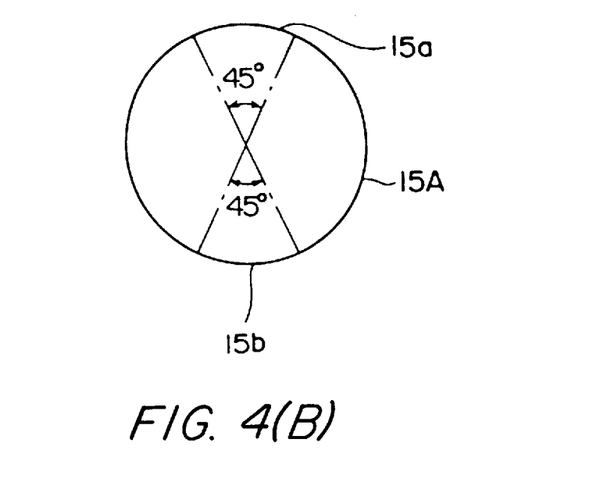
FIG. 4(B) is a plan view of the upper mixing cap of FIG. 4(A)

The outflow ports 15a and 15b are provided in a region defined by a line Y, which connects the other side edges of the inflow ports 13a and 13b in the swirl baffle 13, i.e., connects a connection X of the auxiliary guide plates 13C and 13E to the center O of the cylindrical member 15A of the upper mixing cap 15', and a line Z, which passes through the center O and, as viewed from above, makes an angle of preferably 30° to 135° still preferably 45° to 90° (in the present embodiment, 45°), with the line Y in a direction (in the present embodiments, clockwise direction) opposite to the swirl direction of the cooling fluid and the mixture of a gas with a liquid.

Further, in the present invention, there may be provided a lower mixing cap 16, extending downward, connected to the through hole 14 formed in the collector tray 12 as shown in FIGS. 2(A), 2(B), 3 and 4.

Figure 5:
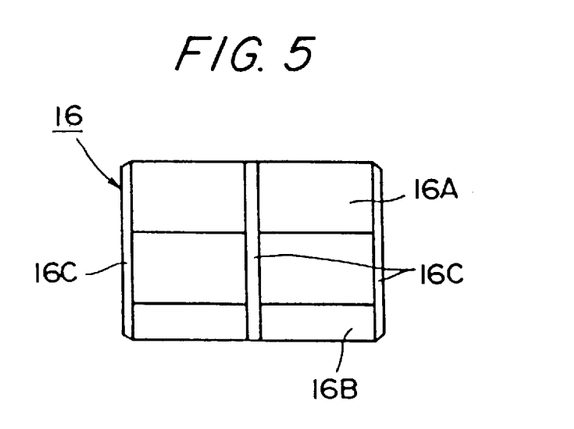
FIG. 5 is a front view of a lower mixing cap.

More specifically, the lower mixing cap 16 comprises a first cylindrical member 16A, with the central axis of the collector tray 12 as the center, both ends of which are open, a second cylindrical member 16B which is provided below the first cylindrical member 16A so as to be discrete therefrom and the top of which is open with the bottom being closed, and a plurality of bridge members 16C for connecting both cylindrical members 16A and 16B to each other.

The collector tray 12 is provided with four gas bypasses 17 for venting.

The function of the mixing tray 11 will be described below.

Returning to FIG. 7, the gaseous phase and the liquid phase, which flow through the mixing tray 11, then flow into a distributing tray 18, where the gaseous phase and the liquid phase are distributed by the distributing tray 18, and are substantially homogeneously spread across the horizontal cross-sectional region of the second catalyst bed 3 of the reactor 5. The gaseous phase and liquid phase components of the mixture flow down through the second catalyst bed 3, where the reaction of the mixture is further allowed to proceed in the presence of a solid catalyst to produce an additional amount of the desired reaction product.

A stream of the second reaction product comprising a gaseous phase and a liquid phase, after emergence from the second catalyst bed 3, enters an outlet cap 19 from which the stream of the reaction product is withdrawn from the reactor 5 through a pipe 20.

For a commercial process using a solid catalyst as a catalyst for a desired reaction, the catalyst should be replaced with a fresh one because it finally loses the catalytic activity.

For the replacement of the catalyst, a catalyst discharge nozzle 21 is provided at the bottom of the reactor in order to discharge the materials from the reactor. The catalyst contained in the second catalyst bed 3 is connected directly to the catalyst discharge nozzle 21, and a blind flange 22 can be removed from the nozzle 21 to discharge the catalyst from the reactor 5 under the influence of the weight of the catalyst.

On the other hand, a number of catalyst discharge pipes 23 are provided for the purpose of removing the catalyst from the first catalyst bed 2 through the catalyst discharge nozzle 21.

A catalyst holding grid 24 is provided on the top of the catalyst discharge pipes 23 and the catalyst discharge pipes 23 are extended downward from the top of the second catalyst bed 3 so that, when the catalyst is removed from the first catalyst bed 2, the catalyst from the first catalyst bed 2 is discharged into the second catalyst bed 3 and removed from the reactor 5 through the catalyst discharge nozzle 21.

The function of the mixing tray 11 will now be described.

The liquid, which flows down through the first catalyst bed 2, and the vapor from the cooling bed 4 drop onto the mixing tray 11 by which the gaseous phase and the liquid phase come into satisfactory contact with each other, resulting in satisfactory heat exchange between the two phases.

Specifically, the liquid, which flows down through the first catalyst bed 2, and the vapor from the cooling bed 4 drop onto the top surface of the collector tray 12 and then flow through the inflow ports 13a and 13b of the swirl baffle 13 tangentially into the swirl baffle 13. The liquid and the vapor, which have flowed into the swirl baffle 13, then flow through within the swirl baffle 13 while swirling and, in the course of swirling, flow away over the weir 15 and are discharged through the through hole 14, in a case that the weir 15 is provided.. The liquid and the vapor, which have been discharged through the through hole 14, flow into the distributing tray 18.

Figure 2B:
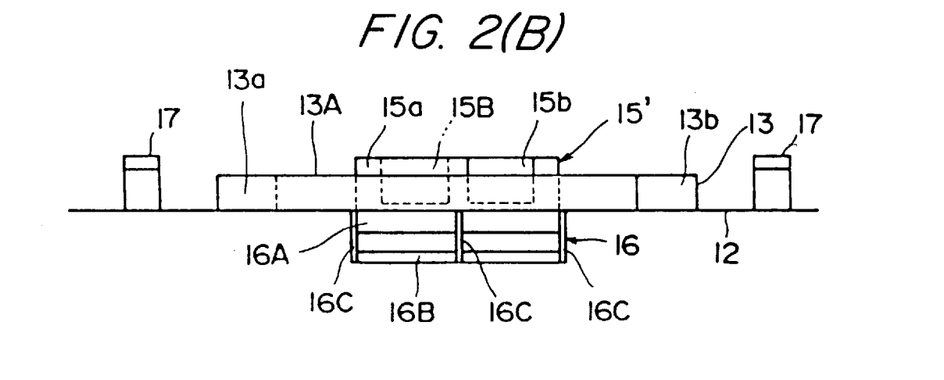
FIG. 2(B) is a front view of the embodiment of the mixing tray of FIG. 2(A)

Instead, in a case that the upper mixing cap 15' and the lower mixing cap 16 are provided, the liquid and the vapor flow away through the outflow ports 15a and 15b provided in the circumferential wall of the cylindrical member 15A of the upper mixing cap 15 and are discharged through the through hole 14. The liquid and the vapor, which have been discharged through the through hole 14, reach the interior of the lower mixing cap 16, drop onto the inner bottom wall of the second cylindrical member 16B of the lower mixing cap 16, and flow into the distributing tray 18 through a gap formed between the first cylindrical member 16A and the second cylindrical member 16B.

The reaction column having the above construction, by virtue of the provision of a mixing tray 11 having a unique construction, has the following advantages.

Since the mixing tray 11 comprises the collector tray 12, the swirl baffle 13, and the weir 15, as described above, mixing can be performed by creating a swirling stream on the collector tray 12.

Further, the mixing tray 11 comprises the contact tray 12, the swirl baffle 13, and the upper mixing cap 15', as described above, thereby mixing can be performed by creating a swirl stream on the contact tray 12 and, at the same time, by providing outflow ports 15a and 15b, for the upper mixing cap 15, for example, at two positions facing each other as in the above embodiment so as for liquids from both directions to collide against each other, mixing can be further accelerated.

Further, by virtue of the provision of the lower mixing cap, the liquid and the vapor discharged from the through hole 14 drop onto the inner bottom wall of the second cylindrical member 16B of the lower mixing cap 16 and flow into the distributing tray 18 through a gap formed between the first cylindrical member 16A and the second cylindrical member 16B. This enables the liquid and the vapor to be effectively distributed and fed into the distributing tray 18, which brings the gaseous phase and the liquid phase into contact with each other in a more effective manner, resulting in satisfactory heat exchange between the two phases.

The present inventors have confirmed the above effects by an experiment.

The method and results of the experiment will now be described.

Figure 8:
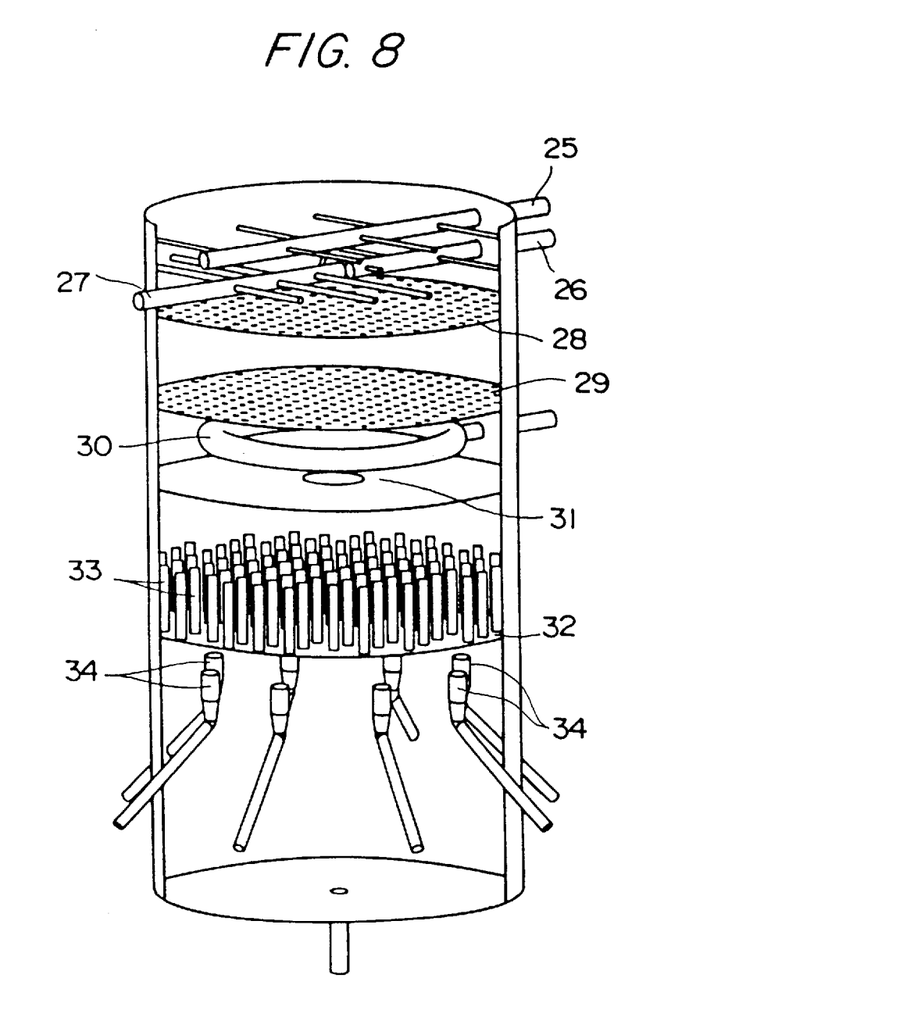
FIG. 8 is a perspective view of a laboratory device.
Figure 16:
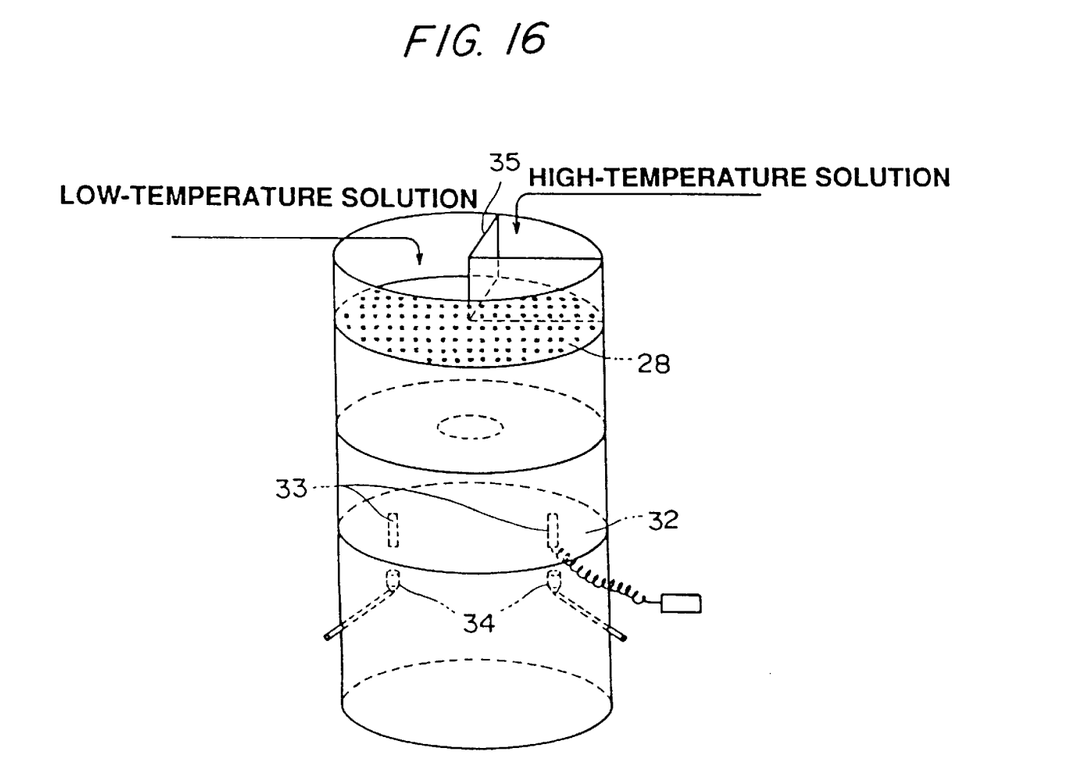
FIG. 16 is a typical view of a laboratory device.

FIG. 8 shows an experimental device, and a typical view thereof is shown in FIG. 16.

Figure 9:
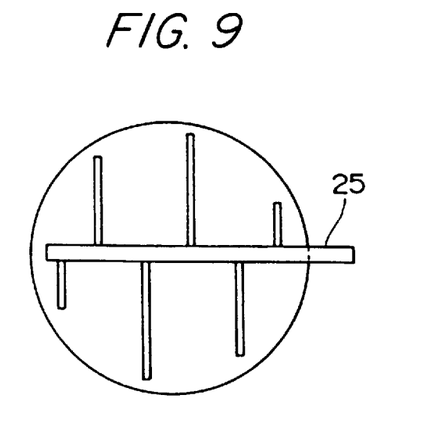
FIG. 9 is a plan view of a vapor feed pipe.
Figure 11:
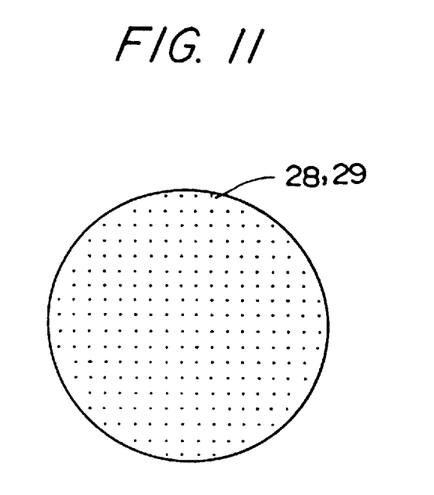
FIG. 11 is a plan view of a perforated plate.
Figure 12:
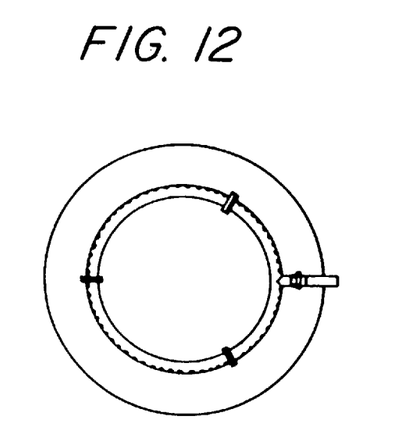
FIG. 12 is a plan view of a cooling ring.
Figure 13:
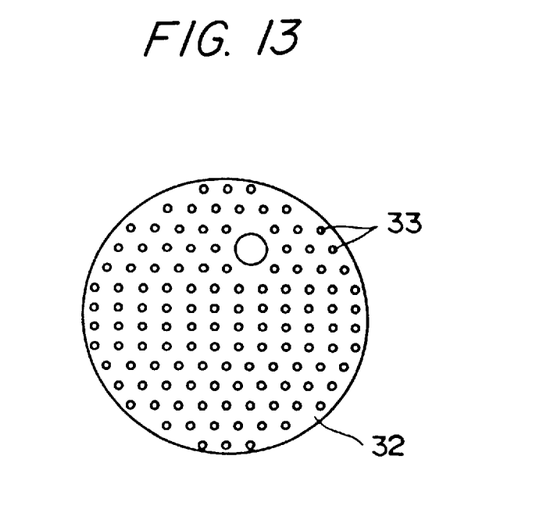
FIG. 13 is a plan view of a distributing tray.
Figure 14:
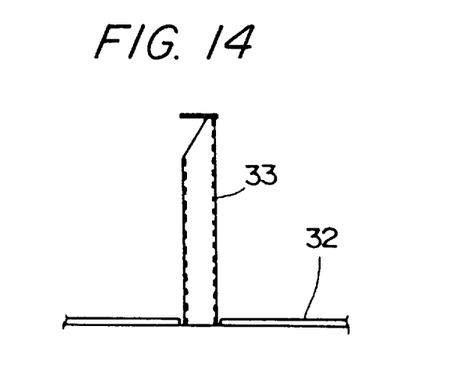
FIG. 14 is a front view of a chimney.
Figure 15:
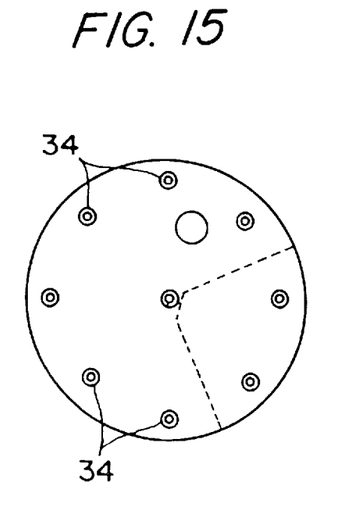
FIG. 15 is a plan view of a cone arrangement.

Specifically, in these drawings, numeral 25 designates a vapor feed pipe (see FIG. 9), numeral 26 a high-temperature solution feed pipe (see FIG. 10), numeral 27 a low-temperature solution feed pipe (see FIG. 10), numerals 28 and 29 each a perforated plate (see FIG. 11), numeral 30 a cooling ring (see FIG. 12), numeral 31 a mixing tray of the present invention, numeral 32 a distributing tray provided with a number of chimneys 33 as shown in FIG. 14 (see FIG. 13), and numeral 34 eight cones (see FIG. 15).

Figure 10:
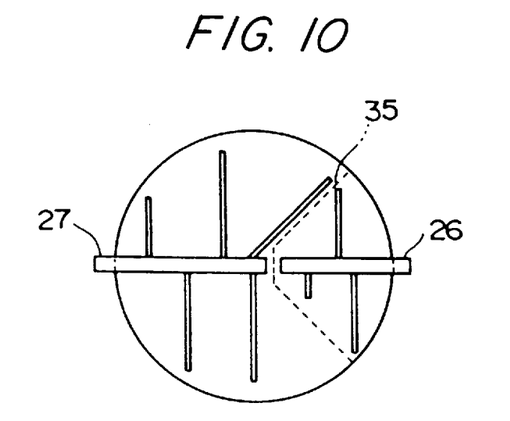
FIG. 10 is a plan view of a high-temperature solution feed pipe and a low-temperature solution feed pipe.

The upper space of the perforated plate 28 is partitioned with a partition plate 35 as shown in FIGS. 10 and 16, and the layout of the cones 34 is as shown in FIG. 15.

In the experiment, the solution in an amount of ¼ of the total volume thereof is heated to cause a temperature difference, and the mixing efficiency is quantified based on temperature distributions at 8 places of the distributing tray 32.

In the present experiment, the mixing efficiency was defined by the following equation:

$$\text{Mixing efficiency } (\%) = 100 - [(T_{hd} - T_{cd})/(T_{hi} - T_{ci})] \times 100$$

wherein

Thd; average of temperatures on the distributing tray 32 in its two portions having the highest and next highest temperatures;

Tcd: average of temperatures on the distributing tray 32 in its remaining six portions having lower temperatures;

Thi: inlet temperature of the high-temperature solution (¼); and

Tci: inlet temperature of the low-temperature solution (¾).

The difference between Thd and Tcd and between Thi and Tci was regulated so as to be not less than 10° F.)

Mixing efficiency 100% refers to that, even when a temperature difference is observed at the inlet (the presence of hot spots in the first catalyst bed 2 being assumed), there is no temperature difference in the distributing tray 32 and the solutions are substantially homogeneously mixed together. On the other hand mixing efficiency 0% refers to that the temperature difference at the inlet is kept as it is also in the distributing tray 32 and there is little or no movement of the solutions in the horizontal direction (i.e., there is little or no mixing).

In the mixing tray 11 of the present invention, a swirling stream is created on the collector tray 12 to attain mixing to some extent. In a case that the weir 15 is provided, mixing efficiency is 93.5–95.6%. Further, in a case that the upper mixing cap 15' is provided, outflow ports 15a and 15b of the upper mixing cap 15 are limited to two places facing each other, and solutions in both directions are allowed to collide with each other, accelerating the mixing. This results in an increase in efficiency to 94.9 to 96.6%, indicating that substantially complete mixing has been attained (the difference in temperature between 8 places on the distributing tray being within 10° F.).

In the above embodiment, the swirl baffle 13 and the upper mixing cap 15 are each provided with two ports, that is, two inflow ports 13a and 13b for the swirl baffle 13 and two outflow ports 15a and 15b for the upper mixing cap 15. In this connection, it is noted that they may be each provided with a plurality of ports, for example, four ports.

Further, in the present embodiment, the swirl direction of the cooling fluid and the mixture of a gas with a liquid in the interior of the swirl baffle 13 is anticlockwise as viewed from above. Alternatively, it may be clockwise. In this case, the connecting direction of the guide plate provided in the inflow ports 13a and 13b of the swirl baffle 13 may be varied.

I claim:

1. A reaction column comprising;

a reactor;

at least one catalyst bed comprising a solid catalyst with which a mixture of a gas with a liquid is brought into contact; and a cooling bed provided below the catalyst bed, the cooling bed comprising:

(a) a cooling fluid feed section and (b) mixing means for mixing a cooling fluid with the mixture of a gas with a liquid falling down through the reactor, the mixing means being provided below the cooling fluid feed section of the cooling bed, the mixing means comprising:

(1) a collector tray provided along a horizontal cross-sectional region of the reactor, the collector tray having a central axis, an upper surface having a center portion, and a through hole provided in the center portion;

(2) a swirl baffle vertically provided substantially at the center portion of the upper surface of the collector tray, the swirl baffle having an interior with the through hole of the collector tray being located in the interior, and the swirl baffle being formed with a cylindrical member having a central axis substantially coincident with the central axis of the collector tray, the cylindrical member having a circumferential wall, inflow ports respectively for the cooling fluid and the mixture of a gas with a liquid being provided at a plurality of positions discrete from each other by a predetermined angle in the circumferential direction of the circumferential wall of the cylindrical member of the swirl baffle, the inflow ports having first and second side edges, and a guide plate being connected in a substantially tangential direction to the first side edge of each of the inflow ports, the guide plate serving to guide the cooling fluid and the mixture of a gas with a liquid so that the cooling fluid and the mixture of a gas with a liquid flowed from the inflow ports into the swirl baffle swirl in the same direction within the swirl baffle; and (3) a weir, extending upward from the collector tray, connected to the through hole in the interior of the swirl baffle, the weir being formed with a cylindrical member having a central axis substantially coincident with the central axis of the collector tray.

2. A reaction column according to claim 1, wherein the cylindrical member of the weir has a circumferential wall, and wherein the weir defines an upper mixing cap and outflow ports respectively for the cooling fluid and the mixture are provided at a plurality of positions discrete from each other by a predetermined angle in the circumferential direction of the circumferential wall of the weir;

the outflow ports being provided in a region defined by a first line and a second line, the first line connecting the second side edges of the inflow ports in the swirl baffle to the central axis of the cylindrical member of the weir, and the second line passing through the central axis of the cylindrical member of the weir and, as viewed from above, making a predetermined angle with the first line in a direction opposite to the swirl direction of the cooling fluid and the mixture of a gas with a liquid.

3. A reaction column according to claim 1, which further comprises a lower mixing cap, extending downward from the collector tray, connected to the through hole formed in the collector tray, said lower mixing cap comprising a first cylindrical member, a second cylindrical member, and a bridge member, the first cylindrical member having a central axis substantially coincident with the central axis of the collector tray and two ends, both of which are open, the second cylindrical member having a top and a bottom and being provided below the first cylindrical member so as to be discrete therefrom and the top being open and the bottom being closed, and the bridge member connecting the first and second cylindrical members to each other.

4. A reaction column according to claim 2, wherein the angle defined by the first and second lines for the provision of the outflow ports is in the range of from 35° to 130°.

5. A reaction column according to claim 2, wherein the angle defined by the first and second lines for the provision of the outflow ports is in the range of from 45° to 90°.

* * * * *